(No Model.) 2 Sheets—Sheet 1.

G. FUNDINGER & U. NESSI.
APPARATUS FOR BOILING EGGS.

No. 551,274. Patented Dec. 10, 1895.

WITNESSES:
Edward Thorpe

INVENTORS
G. Fundinger
U. Nessi
BY
Munn & Co.
ATTORNEYS.

(No Model.) 2 Sheets—Sheet 2.

G. FUNDINGER & U. NESSI.
APPARATUS FOR BOILING EGGS.

No. 551,274. Patented Dec. 10, 1895.

WITNESSES:
Edward Thorpe
J. D. Caplinger

INVENTORS
G. Fundinger
U. Nessi
BY Munn & Co.
ATTORNEYS.

UNITED STATES PATENT OFFICE.

GEORGE FUNDINGER AND ULDERICO NESSI, OF NEW BRIGHTON, NEW YORK.

APPARATUS FOR BOILING EGGS.

SPECIFICATION forming part of Letters Patent No. 551,274, dated December 10, 1895.

Application filed March 30, 1895. Serial No. 543,853. (No model.)

*To all whom it may concern:*

Be it known that we, GEORGE FUNDINGER and ULDERICO NESSI, of New Brighton, in the county of Richmond and State of New York, have invented a new and Improved Apparatus for Boiling Eggs, of which the following is a full, clear, and exact description.

This invention relates to certain improvements in that class of apparatus adapted for use in boiling eggs and the like, wherein is provided means for submerging the eggs or other articles to be boiled and means for raising the eggs out of the boiling water at the end of a predetermined interval; and the object of the invention is to provide a device of this character having a receptacle to hold the eggs to be boiled and provided with a clock mechanism for automatically raising and lowering said receptacle out of and into the water.

The invention also contemplates certain improvements in the construction of the apparatus and particularly in the clock mechanism, whereby the same is made adjustable and adapted to be set so as to act automatically after the lapse of different intervals of time, to raise the egg-receptacle out of the boiling water, all as will be hereinafter fully set forth.

The novel features of the invention will be carefully defined in the claims.

Reference is to be had to the accompanying drawings, forming a part of this specification, in which similar figures and letters of reference indicate corresponding parts in all the views.

Figure 1:
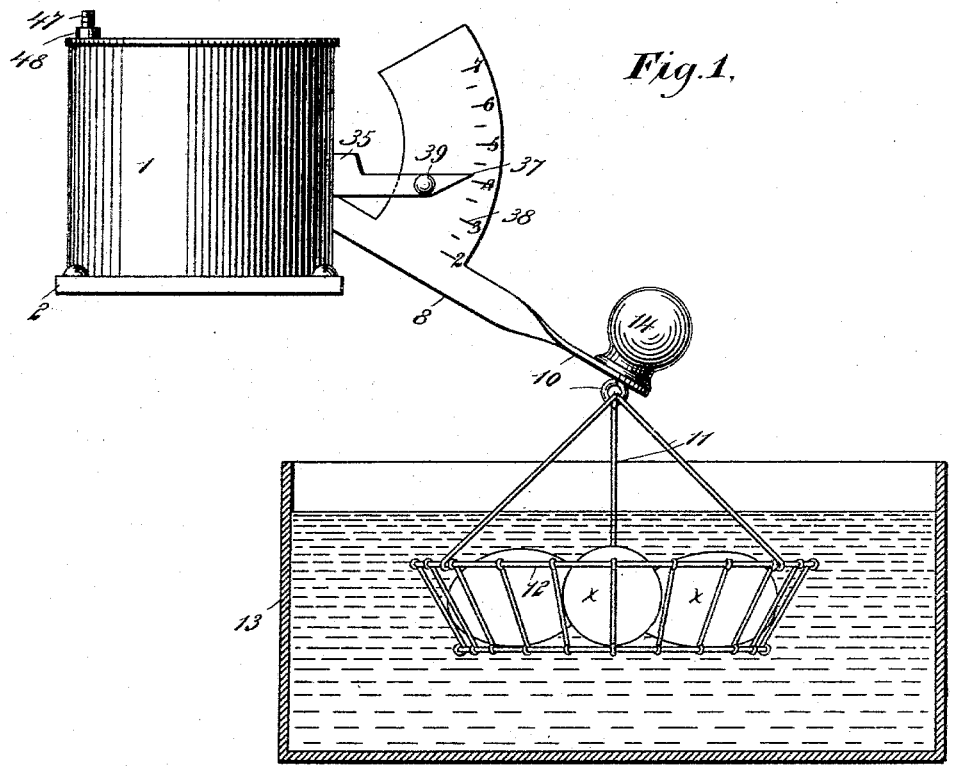
Figure 2:
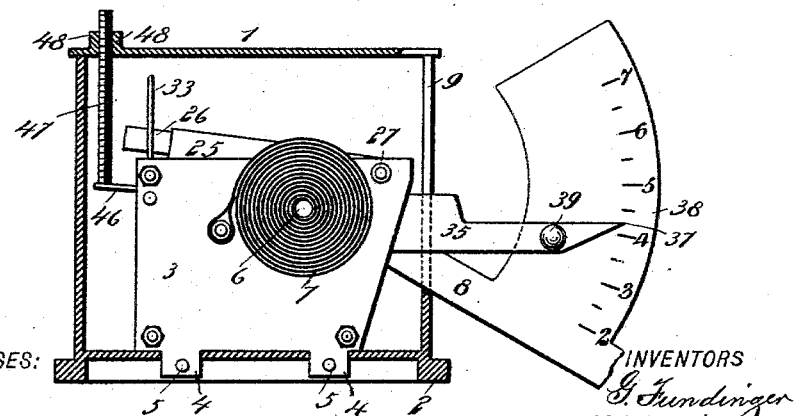
Figure 3:
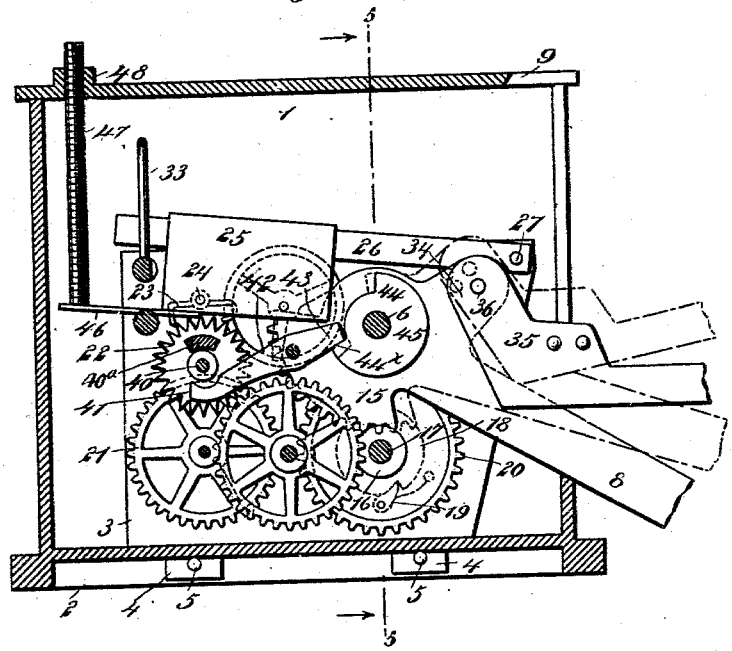
Figure 4:
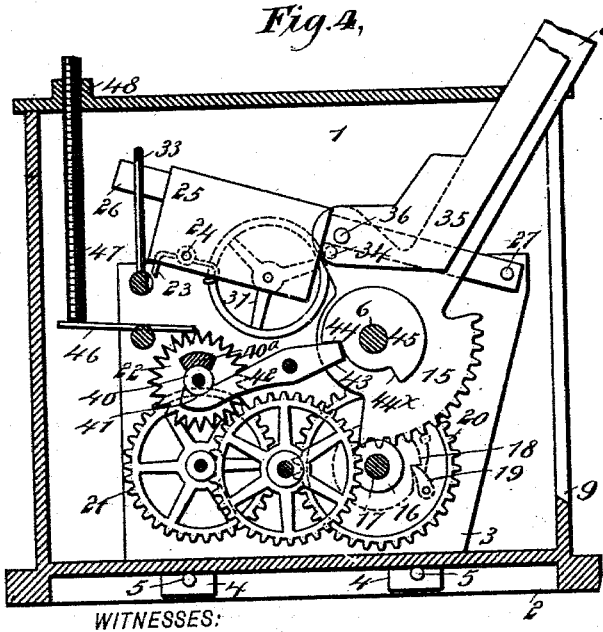
Figure 5:
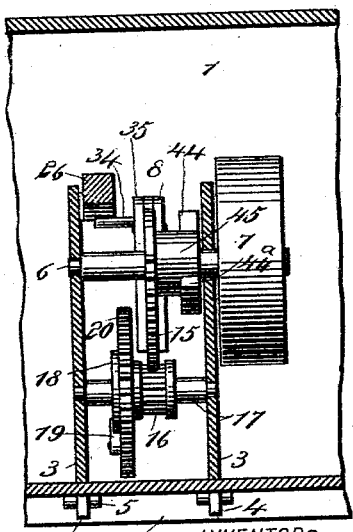
Figure 6:
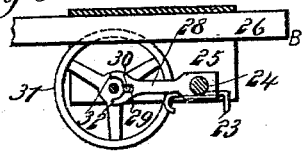

Figure 1 is a general side elevation of an apparatus embodying our improvements, the tank for holding the water being represented in vertical section. Fig. 2 is a vertical sectional view drawn to a larger scale, taken centrally through the casing of the apparatus, the basket-supporting arm being broken away. Fig. 3 is a view similar to Fig. 2, but on a larger scale, the interior framework of the casing being removed to show the inclosed parts of the clockwork. Fig. 4 is a view similar to Fig. 3, but showing the parts in a different position, the basket-carrying arm being raised. Fig. 5 is a sectional view taken vertically in the plane indicated by line 5 5 in Fig. 3 and showing the parts in the same position; and Fig. 6 is a fragmentary detail view showing the balance-wheel and pallet-lever of the escapement device, which will be hereinafter referred to.

In the views, 1 represents a casing which may be of any desired material and form, being, as herein shown, of a general cylindrical form provided with a flange 2 at its base adapted to be secured on any suitable support. Within the casing 1 is arranged a frame composed of side plates 3 having at their bottoms lugs 4 4, adapted to project through apertures in the bottom of casing 1, and provided with openings to receive fastening-pins 5 5 below the bottom of the casing, as clearly indicated in the drawings.

A shaft 6 is journaled in the side plates 3 3 of the internal frame, and one end of said shaft projects beyond the frame at one side thereof and is connected to the inner end of a stout coil-spring 7, the opposite end of which is secured to the casing, as seen in Fig. 2.

Between the side plates 3 3 of the internal frame the shaft 6 is provided with an arm 8 projecting therefrom and adapted to pass, as indicated in the drawings, through a slot 9 formed vertically in the front of the casing 1 of the apparatus, the lower end of said slot forming a limiting stop or abutment to limit the movement of the arm 8 and consequently of the shaft 6. At its outer extremity the arm 8 is provided with an eye 10, to which are connected the upper ends of links 11, the lower ends of which are connected to a wire basket or receptacle 12 of any preferred construction adapted to receive and hold the eggs, (indicated at $x$ in Fig. 1.) The apparatus is so arranged by preference that when the arm 8 is in its lowest position, as seen in Fig. 1, the basket 12 and the eggs therein will be immersed below the level of the water in an open vessel or tank 13, which may be of any preferred kind and heated in any manner, and when said arm 8 is in its highest position said basket 12 and the eggs therein will be raised completely out of the water in said tank. The arm 8 is also provided at its extremity with a handle 14, whereby it may be completely manipulated.

The spring 7 is set to such a tension as to normally hold the arm 8, the basket 12 and the eggs therein in an elevated position, and when the arm 8 is drawn down to its lowest position, as seen in Fig. 1, the tension on said spring will be, of course, correspondingly increased.

The shaft 6 between the side plates 3 of the internal framework is provided with a segment-rack 15, the teeth of which are in engagement with a lantern-wheel 16, secured on a shaft 17 journaled in the side plates 3, whereon is fixed a ratchet-wheel 18, adapted to be engaged by a pawl 19 fixed on one side of a spur-wheel 20 forming one part of a clock-frame, said spur-wheel being loosely mounted on the shaft 17 between the ratchet-wheel 18 and lantern-wheel 16, as clearly seen in Fig. 5. The ratchet-wheel 18 has, as herein shown, one tooth, and the shaft 6 is geared to the shaft 17 in such a way that when the arm 8 is moved from its uppermost to its lowermost position one complete rotation will be imparted to said shaft 17, causing the ratchet-wheel 18 to likewise make one complete rotation, the pawl 19 riding freely over the same, after which said pawl again engages the single tooth of said wheel 18 and holds the same locked to the spur-wheel 20. It will be understood, however, that the number of teeth in said ratchet-wheel 18 may be varied. For example, said wheel may have two teeth, in which case it will be given one-half rotation at each downward movement of the arm 8. In this manner, when the handle 14 of the arm 8 is seized by the operator to move said arm to its lowermost position to immerse the eggs in the basket 12 below the level of the water in the vessel or tank 13, the ratchet-wheel 18 on shaft 17 will freely ride under the pawl 19 and the spur-wheel 20 and will impart no movement to said spur-wheel, but when said arm has arrived at its lowermost position it will be prevented from returning by the engagement of the pawl 19 with the ratchet-wheel 18, whereby the clock-train is thrown into gear with the spring 7 and will be driven therefrom.

The last gear 21 of the clock-train meshes with a pinion or lantern-wheel fixed on the shaft of the verge-wheel 22, the teeth of which are adapted to be engaged by the arms of a pallet-lever 23 fixed on a shaft 24 journaled in a U-shaped frame 25 secured to an escapement-lever 26 pivoted at 27 between the side plates 3 of the internal framework, as seen in Figs. 3 and 4. On the shaft 24 is secured an arm 28 having at its end a notch or slot 29 to receive a pin 30 fixed on the balance-wheel 31 rotatably mounted in the frame 25, and said arm 28 is provided at its extremity with forks or bifurcations 32 at opposite sides of the notch 29, adapted as the shaft 24 rocks in opposite directions to engage the shaft or spindle of the balance-wheel 31 and prevent the withdrawal of the pin 30 from the notch 29 in the end of said arm.

The extremity of the escapement-lever 26 is guided in a loop 33 projecting upwardly from the internal framework, and at its forward end said escapement-lever is arranged in position to be engaged by a pin 34 eccentrically mounted on an adjusting-lever 35 pivoted at 36 to the arm 8, as seen in Figs. 3 and 4, the free end of said lever 35 being arranged parallel and closely adjacent to the arm 8 and having at its extremity an index 37 adapted to play over a curved scale 38 having graduations indicating minutes and fractions thereof, the purpose of which will be hereinafter explained, said lever being provided with a knob or handle 39 whereby it may be manipulated to cause said index to travel along said scale.

The shaft of the verge-wheel 22 is provided with a drum or enlargement 40 adapted to be engaged by a concaved clutch-face 41 formed on the extremity of a lever 42 pivoted in the internal framework, the opposite end 43 of said lever being arranged in position to be engaged by shoulders 44 and 44$^\times$ respectively, formed on a disk 45 secured to the shaft 6, as clearly seen in Figs. 3 and 4. A block 40$^a$ is fixed to the side plate 3 above the drum 40, being provided with a concave clutch-face, and the shaft of the wheel 22 is capable of a slight degree of movement in its bearing at that side of the casing, so that when the lever 42 is actuated to press the clutch-face 41 thereof into engagement with said drum 40 the said shaft will be moved slightly upward or lifted and will be clamped between the block 40$^a$ and clutch-face 41. This arrangement reduces the friction on drum 40 to a minimum when the clockwork is in operation. The shoulders 44 on the disk 45 form a stop or abutment to limit the upward movement of the arm 8 by engaging the end of lever 42 and moving the same into position to clamp the drum 40, thereby effectually stopping said arm against upward movement.

A lever 46 is pivoted in the internal framework with one end adapted to engage the under side of the U-shaped frame 25, mounted on the escapement-lever 26, and the opposite end of said lever is arranged in position to be engaged by the lower end of a screw 47 mounted vertically in the casing 1, being held at its upper end in an internal screw-threaded boss 48 on the top plate of said casing. The upper end of said screw is arranged outside the casing in position to be engaged by a wrench or screwdriver for purposes of adjustment, as will be hereinafter set forth.

In operation, the eggs, &c., to be boiled are arranged in the basket 12 and the arm 8 depressed to its lowermost position, whereby the spring 7 is placed under tension and thrown into engagement with the clock-frame in such a manner as to drive the verge-wheel 22, whereby the shaft 24 is rocked and the balance-wheel 31 actuated in a well-known way. As the spring 7 runs down, the arm 8 will be gradually raised carrying with it the lever 35 and causing the pin 34 thereon to engage under the escapement-lever 26, and lift the same gradually until the arms of the pallet-lever 23 shall have been lifted out of engagement with the teeth of the verge-wheel 22. When this shall have been accomplished, the resistance of the pallet-lever and balance-wheel being no longer exerted upon the clock-frame, the spring 7 will rapidly run down, thereby quickly raising the arm 8 so as to elevate the basket 12, carrying the eggs above the level of the water contained in the tank 13. In order to prevent the clock-frame and the verge-wheel 22 from running on after the arm 8 shall have reached its uppermost position and being stopped by engagement with the upper end of the slot 9 and casing 1, we provide the disk 45 and the clutch-lever 42 above referred to. When the arm 8 is in its uppermost position, as indicated in Fig. 4, the stop or shoulder 44 on the disk 45 will engage the upper side of the end 43 of lever 42 and cause the concaved clutch-face 41 of said lever to bear on the drum 40 on the shaft of the verge-wheel, whereby said wheel will be stopped against rotation, and when the arm 8 is moved in the opposite direction to immerse the eggs in the water, the stop 44$^\times$ on disk 45 acts on the end 43 of lever 42 to disengage the clutch-face 41 from the drum 40, thereby allowing said verge-wheel, together with the clock-frame, to move freely.

In order to regulate the device it is only necessary to turn the screw 47 so as to cause the lever 46 to raise the escapement-lever 26 more or less, whereby the pallets or arms of the pallet-lever 23 are moved more or less into engagement with the teeth of the verge-wheel, as will be readily understood.

By moving the lever 35 on its pivot it will be readily understood that the pin 34, which is eccentrically mounted thereon, will be caused to move up and down and consequently will engage and raise the escapement-lever 26 sooner or later, as may be desired. It will also be seen that the lever 35 when adjusted so as to stand beyond the lower end of the scale on arm 8 will project in front of said arm and consequently will be in position to engage the upper end of the slot 9 in the casing. In this way when the arm 8 moves upward said lever 35 will strike the upper end of slot 9 and be automatically returned to the lowest point on the scale.

The device as above described is of a very simple and inexpensive construction and is not liable to become deranged or broken, its operative parts being inclosed wholly within the case 1; and by reason of the regulating and adjusting devices it is evident that the clock mechanism may be regulated to run faster or slower, and may be adjusted so that the releasing devices will act on the escapement-lever at different intervals to raise the arm and basket containing the eggs from the water.

Having thus described our invention, we claim as new and desire to secure by Letters Patent—

1. In an apparatus for boiling eggs, the combination of a receptacle to contain the eggs, and clock mechanism controlled by said receptacle and adapted when set in motion to move said receptacle upwardly, substantially as set forth.

2. In an apparatus for boiling eggs, the combination of a receptacle to contain the eggs and clock mechanism adapted to be wound by the movement of the receptacle and arranged to move the same in the opposite direction, substantially as set forth.

3. In an apparatus for boiling eggs, the combination of a receptacle to contain the eggs, a movable arm carrying the receptacle, a spring connected to the arm and adapted to be placed under tension when the same is moved in one direction, means for holding said spring under tension, and clock mechanism to release said spring, and permit the same to move the arm in the opposite direction, substantially as set forth.

4. In an apparatus for boiling eggs or the like, the combination of a receptacle, a spring connected to the receptacle and adapted to be placed under tension when the receptacle is moved in one direction, clock mechanism actuated from said spring when the same is placed under tension, and a releasing device actuated by said clock mechanism to release said spring and permit the same to move said receptacle in the opposite direction, substantially as set forth.

5. In an apparatus for boiling eggs or the like, the combination of a receptacle, a spring connected to the receptacle and adapted to be placed under tension when the same is moved in one direction, clock mechanism actuated from said spring when the same is placed under tension, and an adjustable releasing device actuated by said clock mechanism to release said spring after the lapse of different intervals of time to permit the spring to move the receptacle in the opposite direction, substantially as set forth.

6. In an apparatus for boiling eggs and the like, the combination of a receptacle, a spring connected to the receptacle and adapted to be placed under tension when the receptacle is moved in one direction, clock mechanism adapted to hold said spring under tension, a releasing device actuated from the clock mechanism and adapted to release the spring and permit the same to move said receptacle in an opposite direction, and a clutch device actuated from said spring when released to stop said clock mechanism, substantially as set forth.

7. In an apparatus for boiling eggs and the like, the combination of a receptacle, a spring connected to the receptacle and adapted to be placed under tension when the receptacle is moved in one direction, clock mechanism actuated from the spring when placed under tension, a releasing device actuated from the clock mechanism to release said spring and permit the same to move the receptacle in the opposite direction, and a clutch device actuated from the spring when released to stop the clock mechanism, substantially as set forth.

8. In an apparatus for boiling eggs and the like, the combination of a receptacle, a spring connected to the receptacle and adapted to be placed under tension when the receptacle is moved in one direction, clock mechanism adapted to be actuated from said spring when under tension, an adjustable releasing device actuated from the clock mechanism and adapted to release the spring and permit the same to move said receptacle in the opposite direction after the lapse of definite intervals of time, and a clutch device actuated from the spring and adapted to stop the movement of the clock mechanism, substantially as set forth.

9. The combination of a shaft, a receptacle connected to and adapted to be moved by the same, a spring connected thereto and adapted to be placed under tension by the movement thereof in one direction, a clock train geared to said shaft, a verge wheel geared to said clock train, a movable pallet lever to engage the verge wheel, and means actuated by the movement of said receptacle for disengaging the pallet lever from the verge wheel, substantially as set forth.

10. The combination of a shaft, a receptacle connected to and adapted to be moved on the same, a spring connected thereto and adapted to be placed under tension by the movement thereof in one direction, a clock train geared to said shaft, a verge wheel geared to the clock train, a movable escapement lever having a pallet lever to engage said verge wheel, and means, actuated by the movement of said receptacle, for lifting the escapement lever and disengaging the pallet lever from the verge wheel, substantially as set forth.

11. The combination of a shaft having an arm, a spring connected thereto and adapted to be placed under tension when the same is moved in one direction, a clock train geared to the shaft, a verge wheel geared to the clock train, a movable escapement lever having a pallet lever to engage the verge wheel, and a lever pivoted on said arm and adapted to engage to lift the escapement lever to disengage the pallet lever from the verge wheel, substantially as set forth.

12. The combination of a pallet lever, an arm secured thereto and provided with a slot, a balance wheel having a pin to engage the slot in said arm, and stops on opposite sides of the arm to engage the shaft of the balance wheel and prevent the removal of the pin from said slot, substantially as set forth.

13. The combination of a verge wheel, a movable escapement lever, a pallet lever carried thereby and engaging the verge wheel, a regulating lever engaging said escapement lever and adapted to move the same toward and from the verge wheel, and means for moving said regulating lever, substantially as set forth.

14. In an apparatus for boiling eggs, the combination of a receptacle to contain the eggs, clock mechanism connected to said receptacle and provided with a spring arranged to be wound by the movement of the receptacle, means for holding said spring under tension, and a releasing device actuated by said clockwork to release the said spring and permit the same to raise said receptacle, substantially as set forth.

GEORGE FUNDINGER.
ULDERICO NESSI.

Witnesses:
J. D. CAPLINGER,
JNO. M. RITTER.